(12) United States Patent
Skoglun

(10) Patent No.: US 8,113,562 B2
(45) Date of Patent: Feb. 14, 2012

(54) TILTING RACK SYSTEM

(76) Inventor: Jon E. Skoglun, Cashmere, WA (US)

( * ) Notice: Subject to any disclaimer, the term of this patent is extended or adjusted under 35 U.S.C. 154(b) by 330 days.

(21) Appl. No.: 12/584,805

(22) Filed: Sep. 11, 2009

(65) Prior Publication Data

US 2011/0062736 A1   Mar. 17, 2011

(51) Int. Cl.
  *B60P 3/00*   (2006.01)
(52) U.S. Cl. ............................................. 296/3; 224/405
(58) Field of Classification Search ............... 296/183.1, 296/3, 26.06, 26.07, 26.11, 26.05; 224/405; 414/498, 499, 500
See application file for complete search history.

(56) References Cited

U.S. PATENT DOCUMENTS

| | | | | |
|---|---|---|---|---|
| 4,768,824 A * | 9/1988 | Andonian | | 296/165 |
| 5,037,152 A * | 8/1991 | Hendricks | | 296/3 |
| 5,152,570 A * | 10/1992 | Hood | | 296/3 |
| 5,190,337 A * | 3/1993 | McDaniel | | 296/3 |
| 5,281,075 A * | 1/1994 | Tatman et al. | | 414/538 |
| 6,209,944 B1 * | 4/2001 | Billiu et al. | | 296/100.02 |
| 6,332,637 B1 * | 12/2001 | Chambers | | 296/3 |
| 6,637,793 B2 * | 10/2003 | Krause | | 296/3 |
| 6,666,490 B1 * | 12/2003 | Thacker | | 296/26.07 |
| 6,676,220 B2 * | 1/2004 | Mistler | | 298/1 A |
| 7,581,917 B1 * | 9/2009 | Depagter | | 414/462 |
| 7,641,251 B1 * | 1/2010 | Stepanians | | 296/3 |
| 2011/0127790 A1 * | 6/2011 | Mokhtari et al. | | 296/3 |

* cited by examiner

*Primary Examiner* — Jason S Morrow
(74) *Attorney, Agent, or Firm* — Svendsen Legal, LLC

(57) ABSTRACT

An apparatus for tilt-able rack system especially suited for a vehicle, such as a pick-up truck. The tilting rack system includes a stationary upright support frame, and a hinged upright support, with the hinged upright mounted to the vehicle rearward of the stationary upright. A slide-able and tilt-able pair of rails mount to the support frame at the hinged and stationary uprights. As the hinged uprights lever rearward and downward, by action of a hinge at the base of each upright, the rails can slide and tilt upon a sliding hinge at the top of each stationary upright. The rearward, hinged uprights may be actuated by hydraulics, manual cranks, cables, or any other such mechanisms. The entire rail and associated frame can tilt down to the rear of the vehicle, allowing the easy placement of long items on the frame, such as ladders, pipes, boats, boards, and panels.

14 Claims, 6 Drawing Sheets

TILTING RACK SYSTEM

TECHNICAL FIELD

The invention relates to a tilting rack system for a vehicle, which is especially suited for use with a pick-up truck, and more specifically a tilting rack system that includes a levered end-bar that raises or lowers an overhead rack, allowing the rack to tilt rearward as it slides for easy access. The tilting rack system of the present invention is useful for the loading or unloading for pipes, ladders, lumber, or other such items or materials on the rack.

BACKGROUND OF THE INVENTION

Several prior truck rack systems include overhead actuation features that ease the loading and unloading of long or bulky items over the top of the truck's bed, and then over the cab of the truck. U.S. Pat. No. 6,676,220 to Mistler, for instance, includes a 'dump-truck' type of mechanism to tilt the rack of the pick-up truck. However, the mechanism of Mistler requires an extensive retrofit to install, and its mechanism of operation is very complex and raises up high over the truck's cab, creating a potential hazard for impacts. An improved rack is needed that tilts for access to the top level of the rack, and easily retrofits to a vehicle's bed, while operating simply and efficiently.

The following is a disclosure of the present invention that addresses these problems and shortcomings of prior vehicle rack systems, and will be understood by reference to the following detailed description taken in conjunction with the accompanying drawings.

Figure 1:
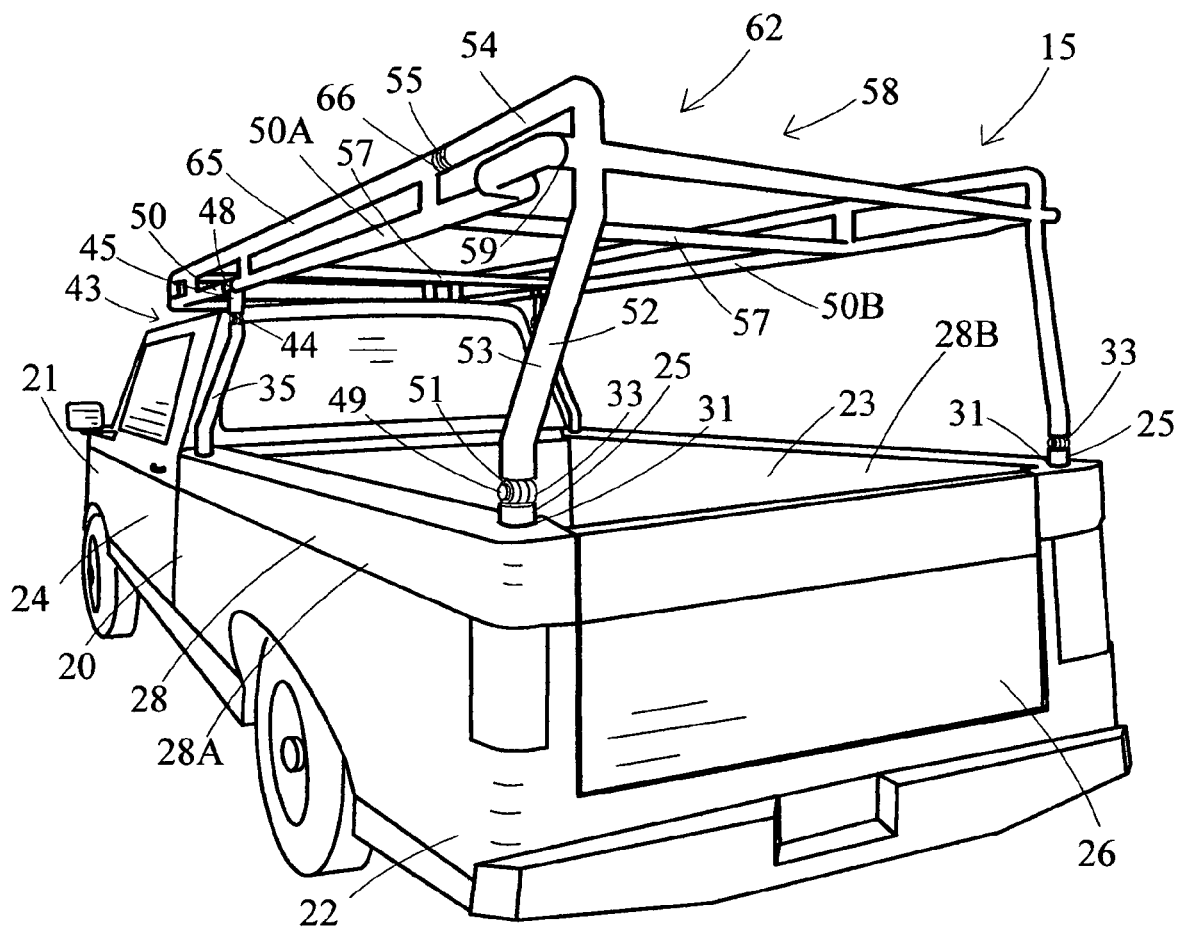
FIG. 1 is a perspective view of a tilting rack system, as mounted to the bed of a pick-up truck, according to an embodiment of the invention.

Reference characters included in the above drawings indicate corresponding parts throughout the several views, as discussed herein. The description herein illustrates preferred embodiments of the invention, and the description herein is not to be construed as limiting the scope of the invention in any manner. It should be understood that the above listed figures are not necessarily to scale and that the embodiments may be illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides for a tilting rack system, specifically configured for a vehicle. FIGS. 1 through 7B show preferred embodiments of the tilting rack system 15, mounted on a vehicle 20, such as a conventional "pick-up" truck. In the conventional pick-up truck, a bed 23 abuts to a cab 24, and as also referenced throughout this written specification, the vehicle includes a forward end 21 and a rearward end 22, as illustrated in FIG. 1 through 4B.

Figure 2:
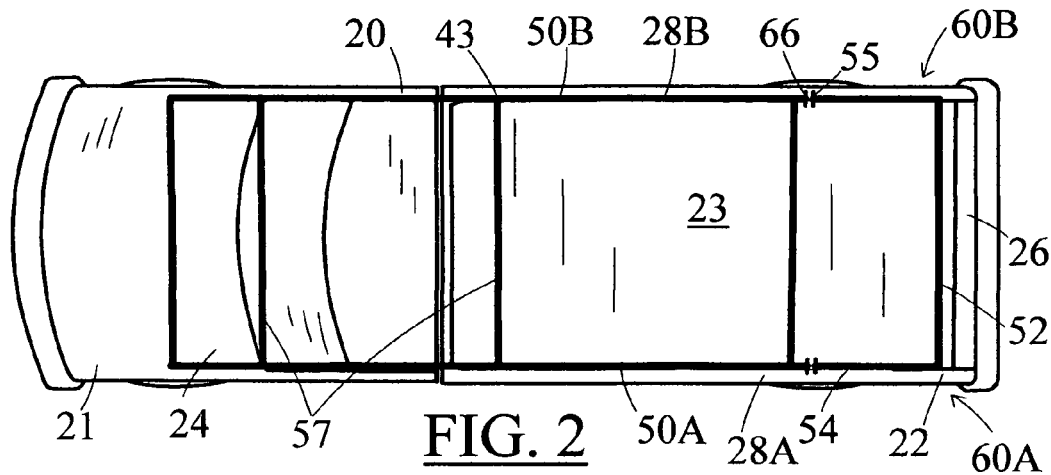
FIG. 2 is a top view of a tilting rack system, as mounted to the bed of a pick-up truck, according to an embodiment of the invention.

The tilting rack system 15 includes a rearward support 25 mounted proximately to the rearward end 22 of the vehicle 20. For a pick-up truck, the rearward end is the end of the vehicle proximate to a tail gate 26. Preferably, the rearward support mounts upon a sidewall 28 of the truck. The sidewall extends upward from a bed-base 29, as shown in FIG. 2, and runs along the length of the bed 23, as shown in FIG. 1. In the typical truck, there are two sidewalls, a first sidewall 28A, opposite the width of the bed to a second sidewall 28B. The rearward support may be received into a standard "rack-socket" 31, as found in the sidewalls of many pick-up trucks. Alternatively, the rearward support 25 may be mounted directly to the sidewall 28, or alternatively mounted onto the bed-base 29. The rearward support extends upward and terminates at a lever-pivot 33, preferably at a point above the height of the sidewall. However, in the alternative, the lever-pivot could be positioned below the top of the sidewall, for operation of the tilting rack system 15 with the tailgate 26 in an open position.

The tilting rack system 15 also includes a forward support 35, positioned forward on the vehicle, relative to the rearward support 25, and preferably mounted proximate to the forward end 21 of the vehicle 20. For a pick-up truck, the forward end is the end of the vehicle proximate to the cab 24, which is the compartment of the vehicle normally occupied by the driver. Most preferably, the forward support mounts upon the sidewall 28, of the bed 23 and proximate to the cab, as shown in FIG. 1. Similar to the rearward support, the forward support also may be received into a standard "rack-socket" 31, as found in the sidewalls of many pick-up trucks.

Figure 3A:
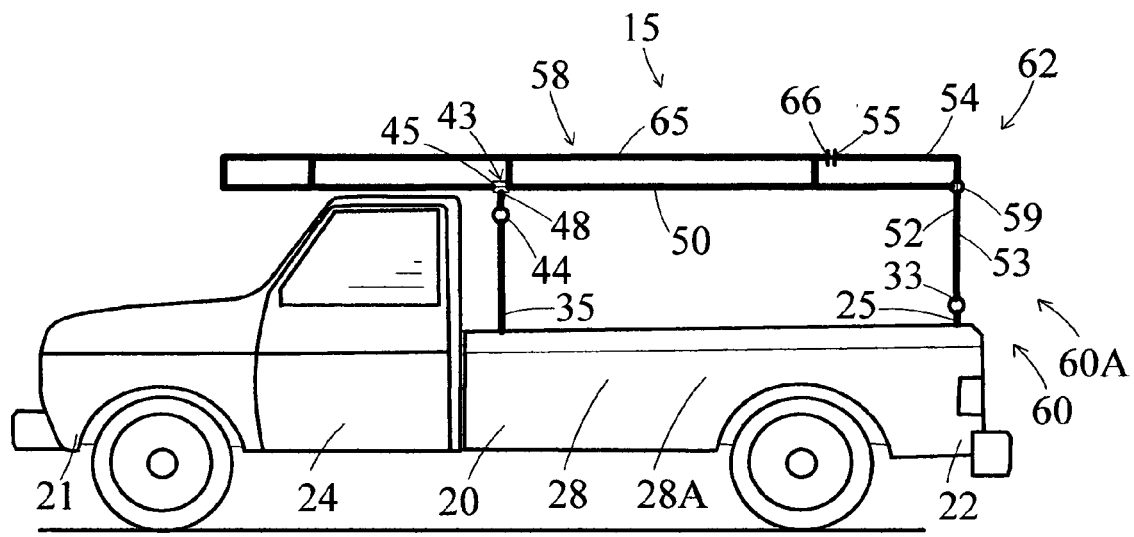
FIG. 3A is a side view of a tilting rack system, according to an embodiment of the invention.
Figure 3B:
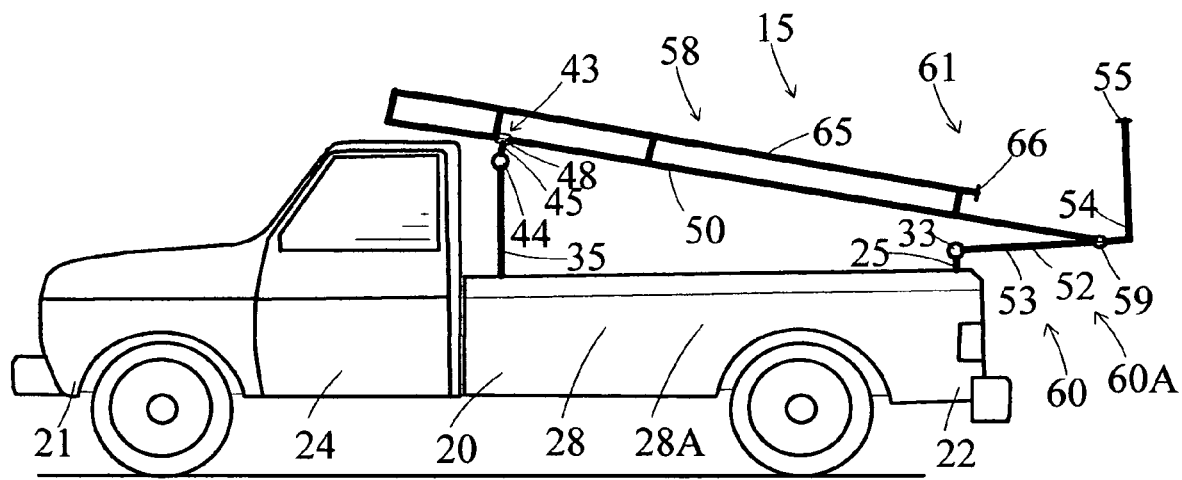
FIG. 3B is a side view of a tilting rack system, according to an embodiment of the invention.

Alternatively, the forward support 35 may be mounted directly to the sidewall 28, or alternatively mounted onto the bed-base 29. The forward support terminates at a slide-pivot 43, preferably at a point above the sidewall, proximate a cab top 42, which is the top surface of the cab 24. Preferably, the slide-pivot is positioned immediately below the cab top, as shown in FIGS. 3A and 3B, and detailed in FIG. 7. However, in the alternative, the forward support termination to the slide-pivot could be positioned at or above the cab top, to clear any lights or attachments that extend above the cab.

The slide-pivot 43 is preferably embodied in two elements, including a rail-pivot 44 positioned below a rail-slide 45, as detailed in FIGS. 7A and 7B, with the forward support 35 terminating at and connected to the rail-pivot. A preferred structure of the rail-slide includes a slide sleeve 48, which is slide-able on a rail 50. Most preferably, a portion of the rail is received into the slide sleeve.

Figure 5:
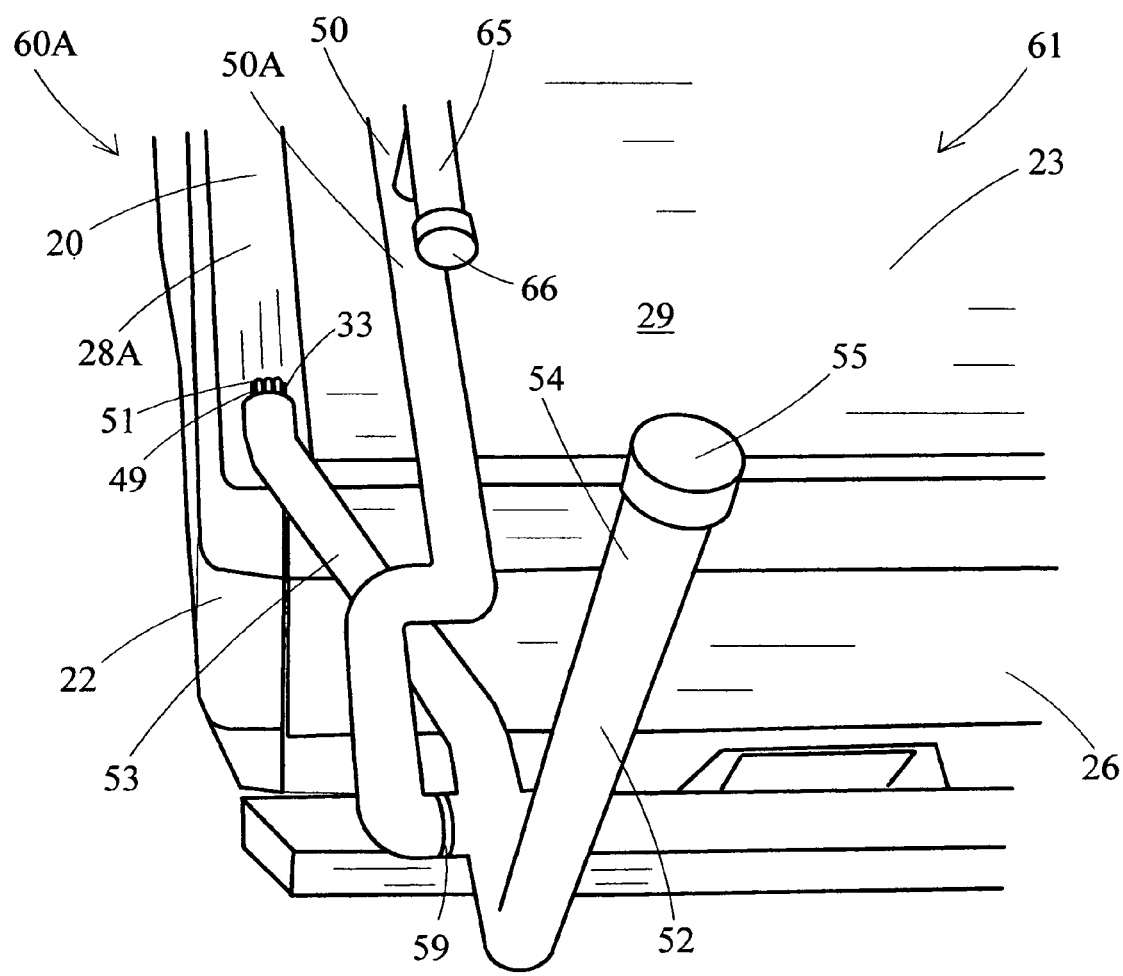
FIG. 5 is a perspective view of a portion of a tilting rack system, according to an embodiment of the invention.
Figure 7A:
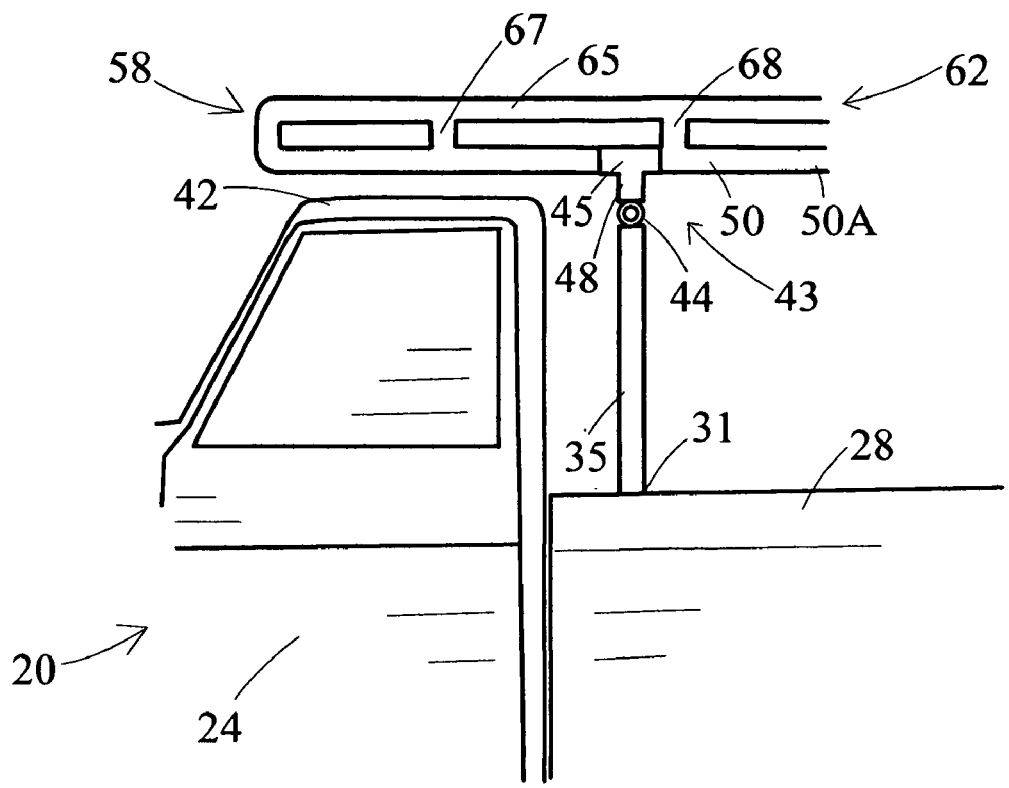
FIG. 7A is a side view of a portion of a tilting rack system, according to an embodiment of the invention.
Figure 7B:
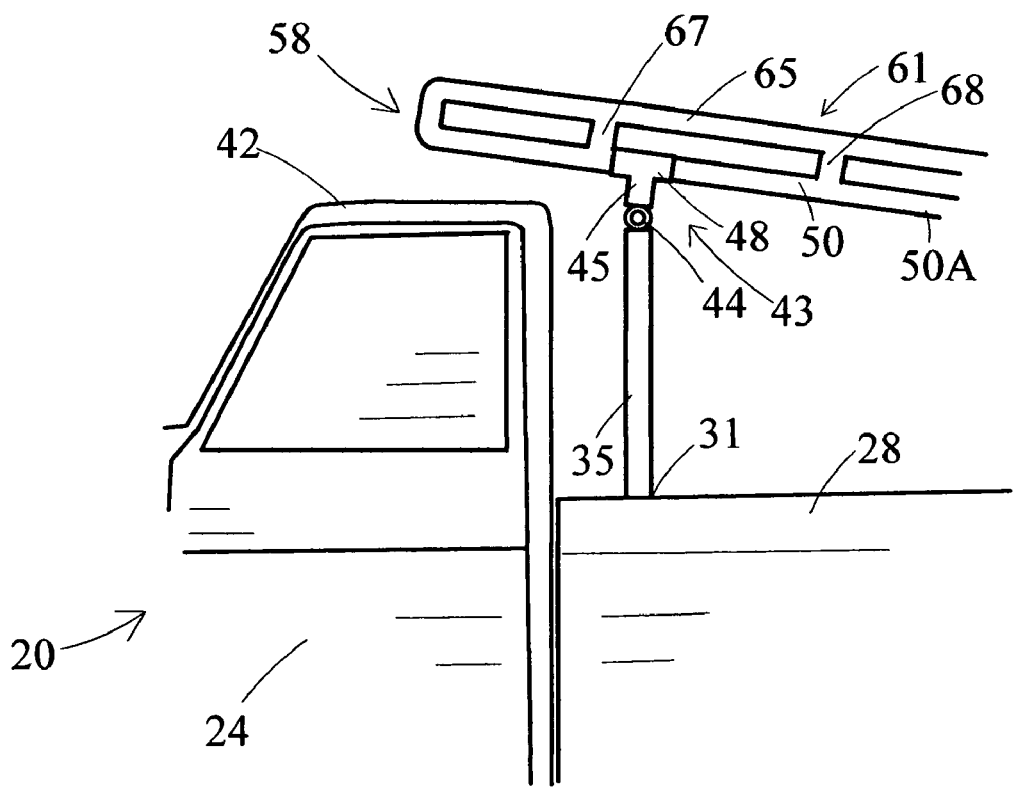
FIG. 7B is a side view of a portion of a tilting rack system, according to an embodiment of the invention.

The rail-slide 45 mounts directly onto and above the rail-pivot 44, as shown in FIGS. 7A and 7B. The rail-pivot is preferably a hinging connection of conventional design, and similar to the lever-pivot 33, as shown in FIGS. 1 and 5, with an axis pin 49 that holds a hinge bearing 51. The hinge bearing connects to the forward support 35 below, and the rail-slide 45 above, to pivot in place as also shown in FIGS. 3A and 3B.

Figure 6A:
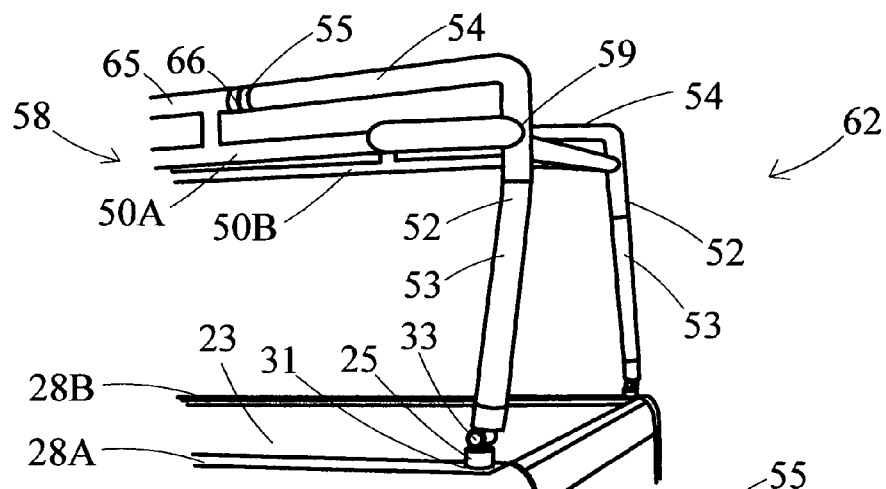
FIG. 6A is a perspective view of a portion of a tilting rack system, according to an embodiment of the invention.
Figure 6B:
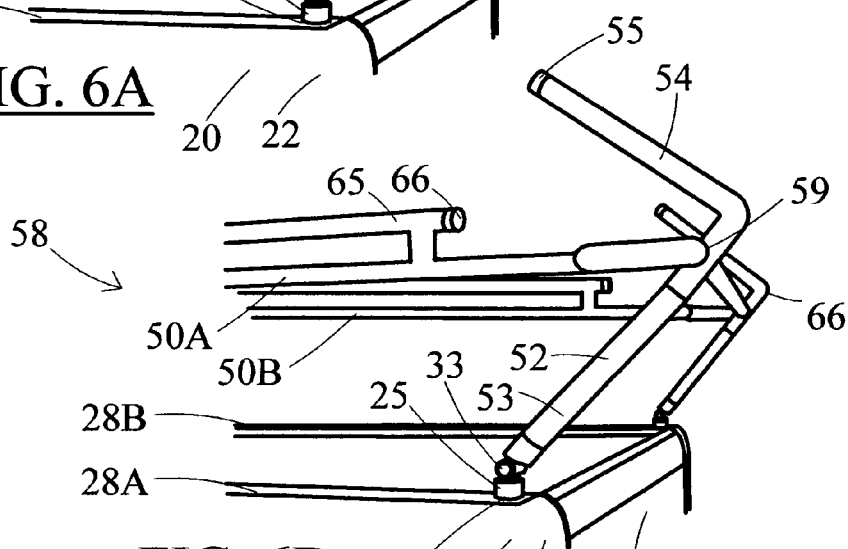
FIG. 6B is a perspective view of a portion of a tilting rack system, according to an embodiment of the invention.
Figure 6C:
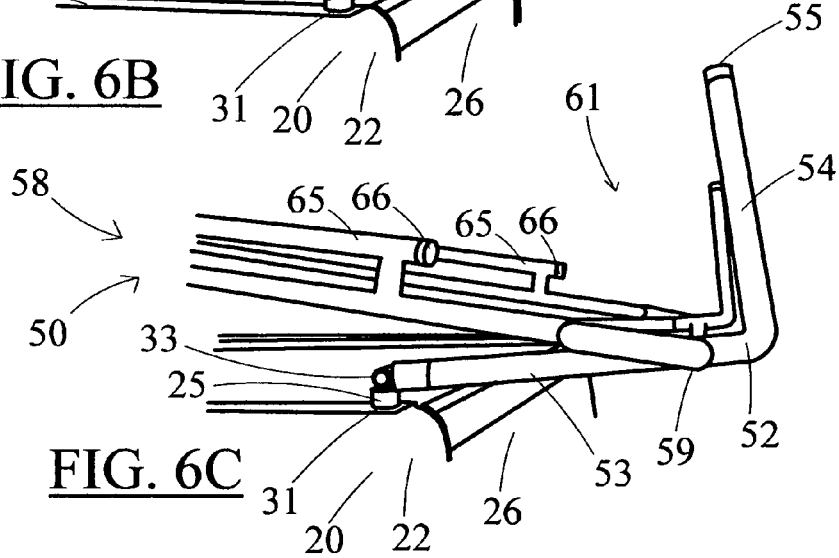
FIG. 6C is a perspective view of a portion of a tilting rack system, according to an embodiment of the invention.

The lever-pivot 33 at the upward end of the rearward support 25 is preferably similar in structure to the rail-pivot 44. The lever-pivot connects to the rearward support below, and the upright arm 53 of the lever 52 above, to pivot in place about the lever-pivot, as shown in FIGS. 3A and 3B. The lever-pivot hingeably connects the rearward support to a lever 52, as shown in FIGS. 6A through 6C. The lever includes an upright arm 53 joined to a forward arm 54, and the forward arm of the lever preferably terminates with a lever head 55.

Most preferably, the upright arm 53 of the lever 52 joins to the forward arm 54 of the lever at approximately a 'right' or ninety-degree angle. The upright arm of the lever connects to the rearward support at the lever-pivot 33, and the upright arm also includes a rail hinge 59, positioned between the lever-pivot and the connection to the forward arm, as detailed in FIG. 5.

The term "approximately" is used herein to refer to a range of values or relative orientations, understood by a person skilled in the pertinent field or skill, as being substantially equivalent to the herein stated values in achieving the desired results, a range typical to the accuracy and precision of conventional tooling, instrumentation or techniques, or a functionally equivalent range of features that produce equivalent results to those described herein.

The rail 50 is preferably, one rail of a substantially parallel set of two rails, bars, pipes or similar structures, and most preferably includes a first rail 50A positioned approximately parallel to a second rail 50B. Preferably, each rail is slide-ably mounted to the forward support 35 at the rail slide 45, and each rail is mounted hingeably to the upright arm 53 of the lever 52 at the rail hinge 59.

A most important functional feature of the tilting rack system 15 is that the each rail 50 together, with the first rail 50A connected to the second rail 50B, along with cross members 57, as shown in FIG. 2, defines a planar load supporting structure or rail frame 58. The rail frame tilts downward, toward the rearward end 22 of the vehicle 20, to an ergonomically efficient working height at the rearward end. This provides for easy access to material stored on the parallel rails for unloading, and also provides for the easy loading of materials onto the rails, by hand. The titling rack system potentially eliminates the need for a second person to load and unload materials from the rail frame.

The hinged forward support 35 and slide-pivot 43 along with the hinging lever 52 and rail hinge 59 that pivot on the rearward support 25 about the lever pivot 33, are discussed herein as a tilting unit 60, which includes all the actuation mechanism required to operate the mechanism, if desired. Most preferably, the tilting unit operates in tandem and in parallel, with a first tilting unit 60A mounted on the first sidewall 28A, and a second tilting unit 60B mounted on the second sidewall 28B, as shown in FIGS. 6A through 6C.

The first tilting unit 60A and the second tilting unit 60B function together, to move the rail frame 58. The levered movement of the rail frame may be actuated manually, or by hydraulic actuators, manual cranks, cables, springs, or any other such mechanisms, as well known to those skilled in the associated actuation technologies. The entire rail frame can tilt down at the rearward end 22 of the vehicle 20, limited only by the height of the tailgate 26, allowing the easy placement of long items on the rail frame. The long items can include ladders, pipe, boats, boards, panels, and the like.

In the operation of the tilting rack system 15, the lever 52 is either raised or lowered, to hinge around the lever-pivot 33. In a lowered position 61 of the tilting rack system, as shown in FIG. 3B, the upright arm 53 of the lever is lowered to a position proximate to the level of the top of the sidewall 28 near the tailgate 26. From the lowered position, the lever 52 hinges about the lever-pivot 33, to raise the rail 50. The rail frame 58 moves toward the forward end of the vehicle 20, as the lever is raised.

The rail frame 58 slides forward with the rail 50 traveling within the rail-slide 45, from the lowered position 61, as shown in FIG. 3B, to a raised position 62, as shown in FIG. 3A. Preferably, the rail frame includes a contact rail 65, as shown in FIGS. 1, and 6A through 6C. Most preferably, two contact rails are employed in tandem, with one contact rail extending in parallel, from each the first rail 50A and the second rail 50B. Each contact rail is separate from and parallel to the rails, most preferably running from near the cab top 42, to proximately the rearward end 22 of the vehicle 20, and terminating with a lever stop 66. As the lever 52 rotates upward and toward the forward end of the vehicle 21, the lever head 55 contacts the lever stop, to prevent the further rotational, hinging motion of the lever toward the forward end of the vehicle, as shown in FIG. 3A.

As shown in FIG. 7B, in the lowered position 61 of the tilting rack system 15, the travel of the rail 50 within the slide sleeve 48 of the rail-slide 45 is preferably limited by a forward slide bar 67. The forward slide-bar extends from the rail 50 to the contact rail 65, above. As the rail moves toward the rearward end 22 of the vehicle 20, the forward slide-bar abuts to the slide sleeve, to prevent further, undesired movement of the rail frame 58 toward the rearward end of the vehicle, as shown in FIG. 3B.

As shown in FIG. 7A, in the raised position 62 of the tilting rack system 15, the travel of the rail 50 within the slide sleeve 48 of the rail-slide 45 is preferably limited by a rearward slide bar 68. Similar to the forward slide-bar 67, the rearward slide-bar extends from the rail 50 to the contact rail 65, above. As the rail moves toward the forward end 21 of the vehicle 20, the rearward slide-bar abuts to the slide sleeve, to prevent further, undesired movement of the rail frame 58 toward the forward end of the vehicle. The forward and rearward side-bars may match-up with the location of the cross members 57 within the rail frame, as shown in FIG. 1.

Figure 4A:
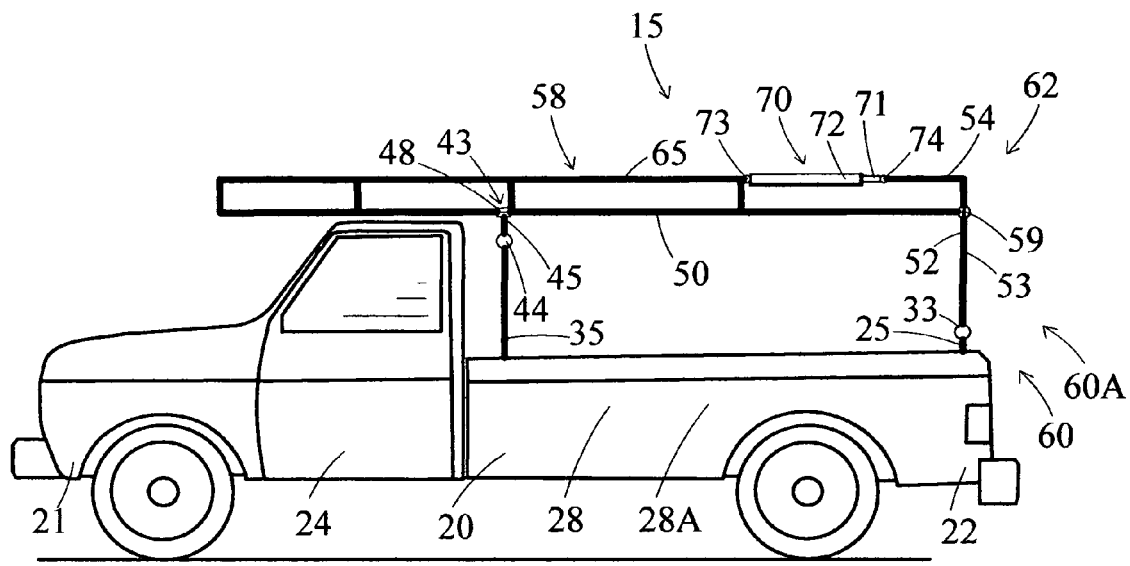
FIG. 4A is a side view of a tilting rack system, according to an embodiment of the invention.
Figure 4B:
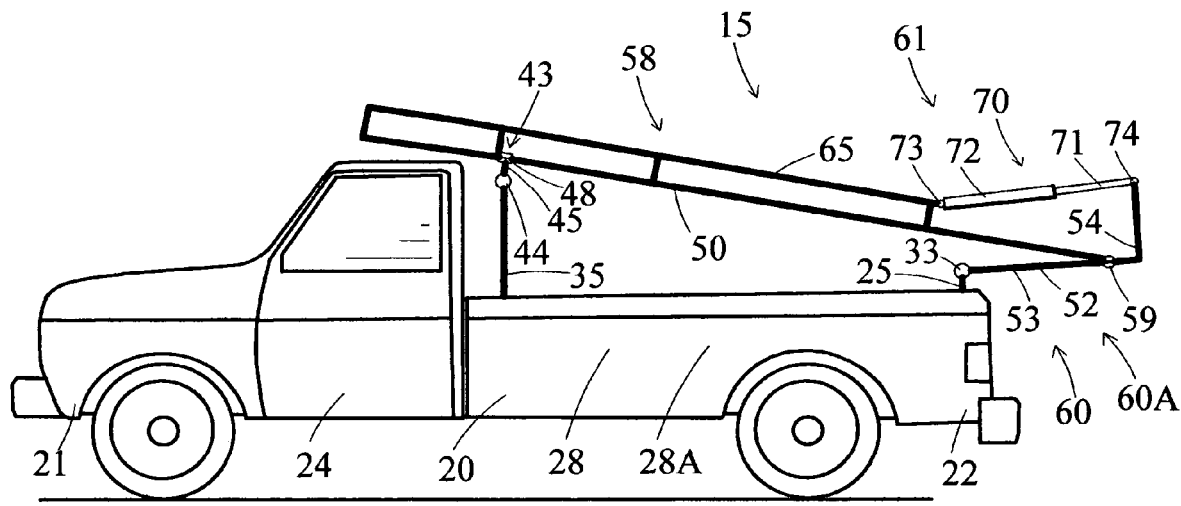
FIG. 4B is a side view of a tilting rack system, according to an embodiment of the invention.

A preferred alternative of the tilting rack system 15 is shown in FIGS. 4A and 4B, and includes an actuator 70, which conventionally includes a piston 71 that extends and retracts from a cylinder 72. The actuator hingeably attached to the contact rail 65 at a cylinder end 73, and hingeably attached to the forward arm 54 of the lever 52 at a piston end 74. The actuator most preferably attaches to the lever stop 66 on the contact rail to interconnect to the lever stop of the forward arm. The actuator may be pneumatic, hydraulic or any such conventional actuator, as employed in conventional actuated machinery.

In comparison to the manual alternative of the tilting rack system 15, the actuator 70 of the alternative embodiment of FIGS. 4A and 4B mounts approximately horizontal, in the raised position 61, with the forward arm 54 of the lever most preferably reduced in length to accommodate the extension of the piston 71. The cylinder 72 of the actuator is preferably approximately three feet in length, with the piston extending approximately two feet against the lever 52. The hinging attachment of the cylinder to the rail 50 is preferably a simple 'clevis' type of pivot connection, and the connection of the piston to the lever is preferably a standard bearing and socket, or alternatively also a clevis type of attachment, as is well known to those skilled in the design and specification of actuators, as employed in vehicles and machinery.

As shown in FIG. 4A, in the normally raised position 62 of the tilting rack system 15, the cylinder is preferably retracted, and approximately parallel with the rail 50. Extending the piston 71, the cylinder 72 pushes the pivoting lever 52 member to the rearward end 22, which creates the desired 'knee-action' pivoting on the rearward support 35, as shown in FIG. 4B. As soon as the cylinder begins extending, it will begin pivoting at the lever stop 66 and rise upward about the cylinder end to an angle of approximately thirty degrees. At the other end of the actuator, specifically at the piston connection to the lever head 55, the actuator pivots much more by comparison, as the initially horizontal forward arm of the lever travels from horizontal to approximately vertical. The piston end 74 of the piston pivots to approximately ninety degrees in rotation about the piston end.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A tilting rack system for a vehicle, the tilting rack system comprising:
    a rearward support, mounted proximate to a rearward end of the vehicle, the rearward support extending upward and terminating at a lever-pivot;
    a forward support, mounted to and extending upward from a forward position on the vehicle relative to the rearward support;
    the forward support terminating at slide-pivot;
    a lever, including an upright arm joined to a forward arm at an approximate angle of ninety-degrees, the upright arm connected to the rearward support at the lever-pivot, and the upright arm having a rail hinge;
    a rail, slide-ably mounted to the forward support at the slide-pivot, and the rail mounted to the lever at the rail hinge; and
    the rail slidable on the slide-pivot of the forward support by a hinging action about the lever pivot.

2. The tilting rack system according to claim 1, further comprising:
    a lever head, on the forward arm of the lever;
    a contact rail, positioned approximately parallel to the rail, the contact rail having a lever stop proximate the rearward end of the vehicle; and
    the lever head contact-able with the lever stop to halt further hinging rotation of the lever about the lever-pivot.

3. The tilting rack system according to claim 1, wherein:
    the slide-pivot includes a rail-pivot hinge-ably attached to a rail-slide; and
    the rail-pivot hinge-ably mounted to the forward support, and the rail-slide slide-ably attached to the rail.

4. The tilting rack system according to claim 3, further comprising:
    a forward slide bar, extending from the rail proximate to the forward end of the vehicle relative to the rail-slide, the forward slide bar for halting travel of the rail-slide toward the rearward end of the vehicle, along the rail; and
    a rearward slide bar, extending from the rail proximate to the rearward end of the vehicle relative to the rail-slide, the rearward slide bar for halting travel of the rail-slide toward the forward end of the vehicle, along the rail.

5. The tilting rack system according to claim 1, wherein:
    the tilting rack system is actuated by a hydraulic actuator, the hydraulic actuator connected between the forward arm of the lever and the rail.

6. A tilting rack system for a vehicle, the tilting rack system comprising:
    a rearward support, extending upward and terminating at a lever-pivot;
    a forward support, extending upward and terminating at slide-pivot, the forward support at a forward position relative to the rearward support;
    a lever, including an upright arm joined to a forward arm, the upright arm connected to the rearward support at the lever-pivot, and the lever having a rail hinge;
    a rail, slide-ably mounted to the forward support at the slide-pivot, and the rail mounted to the lever at the rail hinge; and
    the rail slidable on the slide-pivot of the forward support by a hinging action about the lever pivot.

7. The tilting rack system according to claim 6, wherein the upright arm of the lever joins to the forward arm of the lever at approximately a ninety-degree angle.

8. The tilting rack system according to claim 6, wherein:
    the rearward support is mounted proximate to a rearward end of the vehicle; and
    the forward support is mounted to the vehicle at a position toward a forward end of the vehicle relative to the rearward support.

9. The tilting rack system according to claim 8, further comprising:
    a lever head on the forward arm of the lever;
    a contact rail positioned approximately parallel to the rail, the contact rail having a lever stop proximate the rearward end of the vehicle; and
    the lever head contact-able with the lever stop to halt further hinging rotation of the lever about the lever-pivot.

10. The tilting rack system according to claim 9, wherein:
    the slide-pivot includes a rail-pivot hinge-ably attached to a rail-slide; and
    the rail-pivot hinge-ably mounted to the forward support, and the rail-slide slide-ably attached to the rail.

11. The tilting rack system according to claim 10, further comprising:
    a forward slide bar extending from the rail proximate to the forward end of the vehicle relative to the rail-slide, the forward slide bar for halting travel of the rail-slide toward the rearward end of the vehicle, along the rail; and
    a rearward slide bar extending from the rail proximate to the rearward end of the vehicle relative to the rail-slide, the rearward slide bar for halting travel of the rail-slide toward the forward end of the vehicle, along the rail.

12. The tilting rack system according to claim 6, wherein:
    the tilting rack system is actuated by a hydraulic actuator, the hydraulic actuator connected between the forward arm of the lever and the rail.

13. The tilting rack system according to claim 6, further comprising:

a second rearward support, extending upward and terminating at a second lever-pivot;

a second forward support, extending upward and terminating at second slide-pivot, the second forward support at a forward position relative to the second rearward support;

a second lever, including a second upright arm joined to a second forward arm, the second upright arm connected to the second rearward support at the second lever-pivot, and the second lever having a second rail hinge;

a second rail, slide-ably mounted to the second forward support at the second slide-pivot, and the second rail mounted to the second lever at the second rail hinge; and the second rail slidable on the second slide-pivot of the forward support by hinging action about the second lever pivot.

14. The tilting rack system according to claim 6, wherein the second rail and second lever acts in parallel and tandem with the hinging action of the rail and the lever.

* * * * *